A. HERMANN & W. H. TAYLOR.

Assignor by mesne assignments to the YALE LOCK MANUFACTURING CO.

ANODES FOR ELECTROPLATING WITH NICKEL.

No. 7,489. Reissued Feb. 6, 1877.

WITNESSES

Wm A Skinkle

F. Sitt.

By their Attorney

INVENTORS

AUGUST HERMANN.

WARREN H. TAYLOR

Marcus S. Hopkins.

UNITED STATES PATENT OFFICE

AUGUST HERMANN AND WARREN H. TAYLOR, OF STAMFORD, CONNECTICUT, ASSIGNORS, BY MESNE ASSIGNMENTS, TO THE YALE LOCK MANUFACTURING COMPANY, OF SAME PLACE.

IMPROVEMENT IN ANODES FOR ELECTROPLATING WITH NICKEL.

Specification forming part of Letters Patent No. 166,367, dated August 3, 1875; reissue No. 7,489, dated February 6, 1877; application filed May 5, 1876.

*To all whom it may concern:*

Be it known that we, AUGUST HERMANN and WARREN H. TAYLOR, of Stamford, in the county of Fairfield and State of Connecticut, have invented certain new and useful Improvements in Anodes for Electroplating; and we do hereby declare that the following is a full, clear, and exact description thereof, that will enable those skilled in the art to which they pertain to make and use the same, reference being had to the accompanying drawings.

The object of our invention is to provide a means for successfully and economically using metals in granular form, particularly grain-nickel, or nickel in its commercial state, for electroplating purposes, without passing it through the process of casting.

Our invention consists in the process of making anodes for electroplating by massing particles of grain-nickel or other metal, by means of an adhesive conductor, in which they are embedded, so as to produce a solid unyielding plate, suitable for electroplating purposes; and our invention also consists in an improved anode for electroplating thus formed.

Our process of making our improved anodes consists in taking the ordinary carbon plate used in anodes for electroplating, and, while it is yet in a plastic state, embedding particles of the metal therein, so that when baked or otherwise dried the said metal particles will be firmly and securely united with the carbon plate, and the whole made to constitute a firm compact mass.

When the plate A is made of other material than carbon—for instance, of platinum—the small pieces of metal are united to the outside thereof by any adhesive sticking substance, such as shellac, glue, or other suitable substance.

Figure 1:
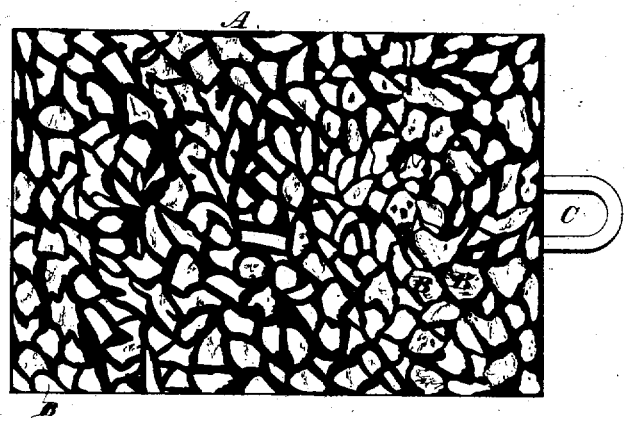
Figure 2:
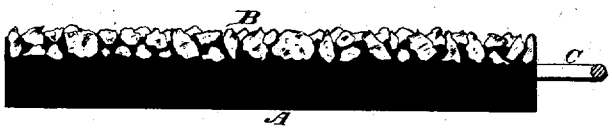

In the drawings, Figure 1 is an elevation of our improved anode. Fig. 2 is a side view of the same.

The letter A indicates the carbon plate; B B, the particles of metal pressed into the same; and C, a copper staple secured to the anode, for suspending it, and also for connecting the electric wire.

What we claim as our invention is—

1. An anode for electroplating, consisting of a conductor, with particles of the metal to be deposited embedded therein, substantially as herein set forth.

2. An anode for electroplating, consisting of a carbon conductor, with particles of the metal to be deposited embedded therein, and provided with a metallic connector, substantially as herein set forth.

3. An anode for electroplating, consisting of a conductor, with particles of the metal to be deposited united thereto by means of an adhesive substance, substantially as herein set forth.

4. The process of forming anodes for electroplating, consisting of embedding the particles of metal to be deposited in a suitable conductor, substantially as herein set forth.

AUGUST HERMANN.
WARREN H. TAYLOR.

Witnesses:
JOHN HEINS,
WALTER FULLER.